United States Patent
Oikawa et al.

(10) Patent No.: US 11,940,430 B2
(45) Date of Patent: Mar. 26, 2024

(54) SUPPRESSOR SYSTEM, AND METHOD FOR DETERMINING LIFE OF ION EXCHANGE RESIN COLUMN

(71) Applicant: Shimadzu Corporation, Kyoto (JP)

(72) Inventors: Yukio Oikawa, Kyoto (JP); Hiroshi Tanaka, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 763 days.

(21) Appl. No.: 15/574,404

(22) PCT Filed: May 22, 2015

(86) PCT No.: PCT/JP2015/064689
§ 371 (c)(1),
(2) Date: Nov. 15, 2017

(87) PCT Pub. No.: WO2016/189574
PCT Pub. Date: Dec. 1, 2016

(65) Prior Publication Data
US 2018/0136176 A1 May 17, 2018

(51) Int. Cl.
B01D 15/36 (2006.01)
B01D 35/143 (2006.01)
(Continued)

(52) U.S. Cl.
CPC ........... *G01N 30/96* (2013.01); *B01D 15/363* (2013.01); *B01D 69/02* (2013.01); *G01N 30/02* (2013.01);
(Continued)

(58) Field of Classification Search
CPC .. B01D 15/363; B01D 69/02; B01D 2325/42; B01D 15/36; B01D 15/10; B01D 61/243;
(Continued)

(56) References Cited

U.S. PATENT DOCUMENTS 5,372,717 A * 12/1994 Abolt ................ B01J 41/20
210/198.2
2007/0273868 A1* 11/2007 Yano ................ B01J 41/07
356/36

(Continued)

FOREIGN PATENT DOCUMENTS

JP 2006-292446 10/2006
JP 2006-292446 A 10/2006
(Continued)

OTHER PUBLICATIONS

Wang, The design for ion exchange column, Oaseo, Mar. 2015, entire document (Year: 2015).*
(Continued)

Primary Examiner — Terry K Cecil
(74) Attorney, Agent, or Firm — Muir Patent Law, PLLC

(57) ABSTRACT

The suppressor system is provided with: a suppressor which has an eluent flow path and a suppression solution flow path, the eluent flow path and the suppression solution flow path being separated from each other by an ion exchange membrane; a circulation flow path which connects the inlet and the outlet of the suppression solution flow path of the suppressor, and circulates a suppression solution; an ion exchange resin column which is provided on the circulation flow path, and is equipped with a resin accommodation unit through which the suppression solution flowing out of the suppressor is passed, an acidic or alkaline ion exchange resin being accommodated in the resin accommodation unit; and a life detector which determines the life of the ion exchange resin in the ion exchange resin column.

8 Claims, 4 Drawing Sheets

(51) Int. Cl.
  *B01D 61/24* (2006.01)
  *B01D 69/02* (2006.01)
  *G01N 30/02* (2006.01)
  *G01N 30/96* (2006.01)

(52) U.S. Cl.
  CPC ........ *B01D 35/143* (2013.01); *B01D 2325/42* (2013.01); *G01N 2030/965* (2013.01)

(58) Field of Classification Search
  CPC .. B01D 61/44; B01D 35/143; B01D 35/1435; G01N 30/96; G01N 30/02; G01N 2030/965; G01N 30/74; G01N 2030/0035; G01N 2030/746; G01N 21/21; G01N 30/26; G01N 30/6095; B01J 49/85; B01J 39/07; B01J 41/07; B01J 41/20; B01J 45/00; B01J 47/04; B01J 49/08; B01J 49/30; B01J 49/53; B01J 49/57; B01J 49/60; B01J 49/80; B01J 49/90; B01J 47/016; C02F 1/42; C02F 1/006; C02F 1/008; C02F 2209/05; C02F 2209/055; C02F 2301/043; C02F 2303/16; C02F 2209/445; C22B 3/24; C22B 3/42; G05D 21/02; Y02P 10/20; Y02P 10/234
  See application file for complete search history.

(56) References Cited

U.S. PATENT DOCUMENTS

| | | | | |
|---|---|---|---|---|
| 2007/0295665 | A1* | 12/2007 | Ayala | C02F 1/008 210/670 |
| 2009/0211980 | A1 | 8/2009 | Liu et al. | |
| 2010/0032380 | A1* | 2/2010 | Tokita | G01F 23/2921 210/744 |
| 2013/0256232 | A1* | 10/2013 | Liu | G01N 30/26 210/656 |
| 2014/0332387 | A1* | 11/2014 | Srinivasan | B01J 41/20 204/536 |

FOREIGN PATENT DOCUMENTS

| | | |
|---|---|---|
| JP | 2011-513707 | 4/2011 |
| JP | 2011-513707 A | 4/2011 |

OTHER PUBLICATIONS

Ramzan, Performance analysis of cation and anion exchangers in water treatment plant: an industrial case study, Jul. 1, 2012, Polish Journal of Chemical Technology, p. 1-3 (Year: 2012).*
First Office Action dated Sep. 17, 2019 for corresponding Chinese patent application No. 201580078856.3.
Feinholz et al., "Stray Light Correction of the Marine Optical System." DOI: 10.1175/2008JTECHO597.1 2009 American Meteorological Society.
Notification of Reasons for Refusal dated Jul. 10, 2018 for Japanese Patent Application No. 2017-520052, (translation is machine translation).

* cited by examiner

SUPPRESSOR SYSTEM, AND METHOD FOR DETERMINING LIFE OF ION EXCHANGE RESIN COLUMN

TECHNICAL FIELD

The present invention relates to a suppressor system used for removing unnecessary ions in an eluent from an analytical column in an ion chromatograph and a method for determining a life of an ion exchange resin used for regenerating a suppression solution of the suppressor system.

BACKGROUND ART

In an ion chromatograph, a suppressor is generally provided on a post-stage side of a separation column in order to stabilize the baseline by removing unnecessary ions in an eluent from an analytical column (see Patent Document 1). The suppressor includes an eluent flow path through which an eluent flowing out of a separation column flows and a suppression solution flow path separated from the eluent flow path by an ion exchange membrane. Unnecessary ions in the eluent is absorbed by an ion exchange membrane and the ions absorbed by the ion exchange membrane is taken into a suppression solution in the suppression solution flow path, so that the ion exchange membrane is regenerated (See Patent Document 2).

PRIOR ART

Patent Document

Patent Document 1: Japanese Unexamined Patent Application Publication No. 2010-2185
Patent Document 2: Japanese Unexamined Patent Application Publication No. 2009-115637

SUMMARY OF THE INVENTION

Problems to be Solved by the Invention

The suppression solution into which ions were taken from the ion exchange membrane in the suppressor flows out of the suppressor and then is introduced into a regenerator in which an ion exchange resin is filled. In the regenerator, the ions taken from the ion exchange membrane are removed. The suppression solution from which the ions were removed is supplied to the suppressor again as a suppression solution. The life of the ion exchange resin of this regenerator is ended when the adsorbed ions are saturated and reach a breakthrough point. As a result, the ability of removing ions from the suppression solution deteriorates, resulting in a reduced ion removal ability of the suppressor, which in turn affects the analysis result.

In a state in which the ion chromatograph is being used, whether or not the ion removal ability of the suppressor has been deteriorated cannot be known.

Under the circumstances, the present invention aims to enable easy detection of a life of an ion exchange resin used for regenerating a suppression solution.

Means for Solving the Problems

According to one embodiment of a suppressor system according to the present invention, a suppressor system includes: a suppressor having an eluent flow path through which an eluent flows and a suppression solution flow path through which a suppression solution flows, the eluent flow path and the suppression solution flow path being provided so as to be separated by an ion exchange membrane; a circulation flow path that connects an inlet and an outlet of the suppression solution flow path of the suppressor to circulate the suppression solution; an ion exchange resin column provided on the circulation flow path and including a resin accommodation unit through which the suppression solution flowing out of the suppressor flows and an acidic or alkaline ion exchange resin accommodated in the resin accommodation unit; and a life detector configured to determine a life of the ion exchange resin in the ion exchange resin column.

According to one embodiment of a method for determining a life of an ion exchange resin column according to the present invention, a method for determining a life of an ion exchange resin column includes: making at least a part of a portion constituting an upper portion of a resin accommodation unit when an ion exchange column having a resin accommodation unit in which an ion exchange resin is accommodated is arranged in a vertical direction as a light transmitting portion that changes in optical transparency according to a volume change of an ion exchange resin in the resin accommodation unit; and determining the life of the ion exchange resin column based on a change of the optical transparency in the light transmitting portion.

In the case of a strong acidic ion exchange resin or a weak alkaline ion exchange resin, when the ion exchange resin reaches a breakthrough point at which ions are saturated and therefore the ion exchange resin becomes unable to absorb target ions to be removed, the strong acidic cation exchange resin decreases in volume and the weak alkaline anion exchange resin increases in volume. From this phenomenon, in a strong acidic cation exchange resin column, there is a position where an ion exchange resin no longer exists after volume reduction due to breakthrough of the ion exchange resin. On the other hand, in a weak alkaline anion exchange resin column, there is a position where an ion exchange resin will become present after the volume increase due to breakthrough of the ion exchange resin. Therefore, when the optical transparency is observed at such a position, the volume change of the ion exchange resin can be optically detected. As a result, the life of the ion exchange resin can be judged.

Effects of the Invention

In one embodiment of the suppressor system according to the present invention, since a life detector for determining the life of the ion exchange resin in the ion exchange resin column is provided, the life of the ion exchange resin for regenerating the suppression solution can be easily detected.

In one embodiment of a method for determining a life of the ion exchange resin column according to the present invention, since the life of the ion exchange resin can be optically detected, the life of the ion exchange resin can be quickly and easily judged.

EMBODIMENTS FOR CARRYING OUT THE INVENTION

Figure 1:
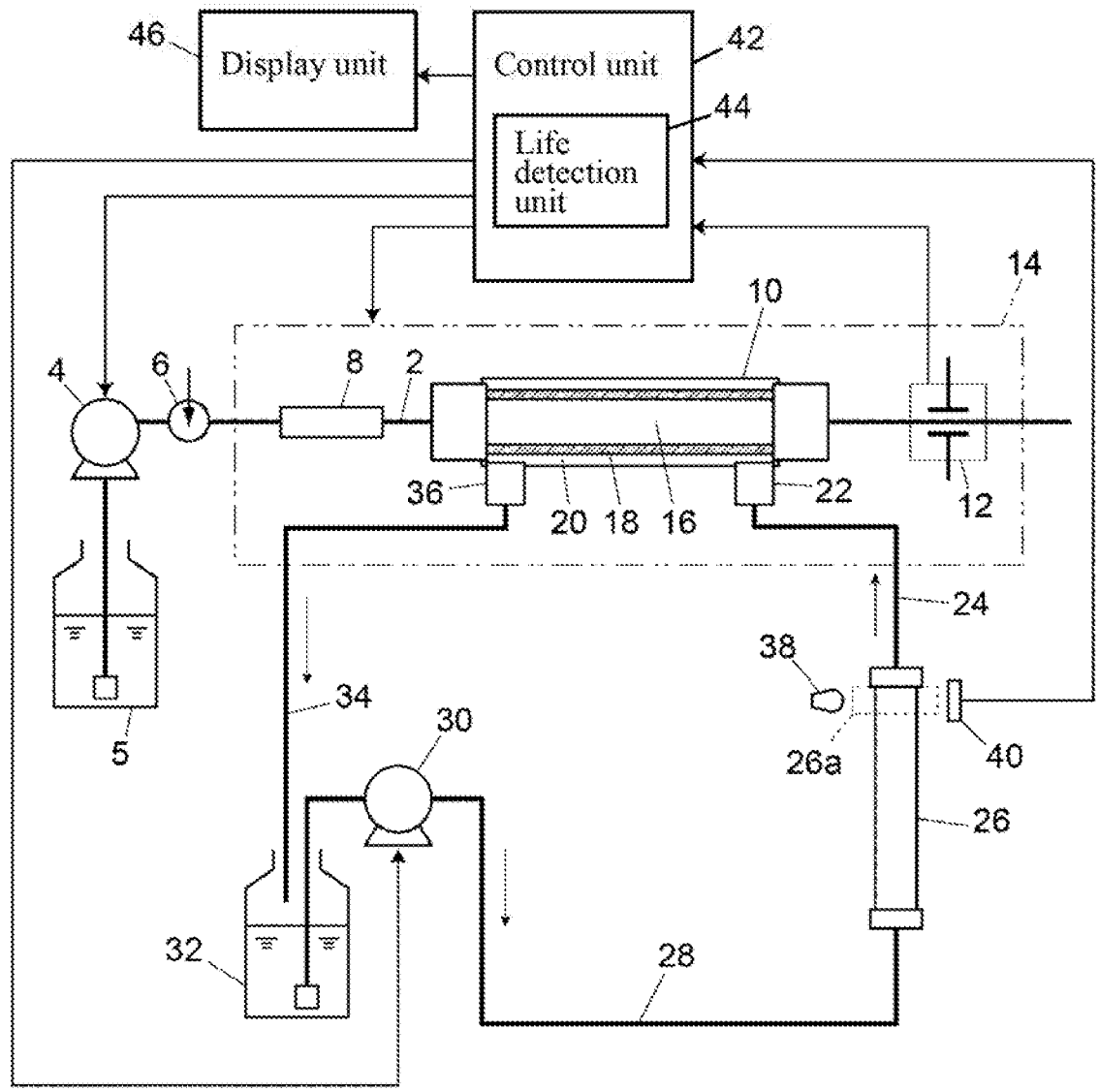
FIG. 1 is a schematic configuration diagram showing an example of a suppressor system incorporated in an ion chromatograph.

In one embodiment of a suppressor system according to the present invention, it is preferably configured such that a light transmitting portion that changes in optical transparency according to an existence state of an ion exchange resin in a resin accommodation unit is provided at an upper end portion of a resin accommodation unit of an ion exchange resin column and that a life detector includes a light source that emits light toward the light transmitting portion of the ion exchange resin column and a light detector that detects a change of the optical transparency in the light transmitting portion to detect a life of the ion exchange resin based on an output signal of the light detector. With this, it becomes possible to use a method of detecting the life of the ion exchange resin by the aforementioned optical method, which in turn can quickly and easily detect the life of the ion exchange resin.

In the aforementioned embodiment, in cases where the ion exchange resin is a strong acidic cation exchange resin whose volume decreases due to adsorption of a cation, the life detector detects the life of the ion exchange resin when the light transparency of the light transmitting portion is improved based on a detection signal of the light detector.

Further, in cases where the ion exchange resin is a weak alkaline anion exchange resin whose volume increases due to adsorption of an anion, the life detector detects the life of the ion exchange resin when the light transparency of the light transmitting portion is decreased based on a detection signal of the light detector.

When the light from the light source is irradiated to the upper end portion of the resin accommodation unit of the ion exchange resin column, in cases where the ion exchange resin is a cation exchange resin, it will be judged such that the life of the ion exchange resin is ended even if the volume is slightly decreased despite that it is still usable. On the other hand, in the case of an anion exchange resin, since the life of the ion exchange resin will not be detected until the volume of the resin is maximally increased, the analysis will be carried out in a state in which a column having a reduced anion adsorption ability is used.

For this reason, it is preferable to arrange the light source so that the light is irradiated horizontally to a position lower than the upper end of the resin accommodation unit of the ion exchange resin column by about 50% of a maximum amount of displacement of the upper end of the ion exchange resin. With this, it is possible to reliably detect the change in volume of the ion exchange resin due to adsorption of a cation or an anion.

In the aforementioned case, it is preferable that a diameter of the light to be irradiated from the light source to the resin accommodation unit is 0.5% or less of a length of the resin accommodation unit. If the diameter of the light from the light source is large, it can happen that only a part of the light from the light source is transmitted or shielded when the volume change of the ion exchange resin occurs. In such as case, it is sometime difficult to determine the life of the ion exchange resin based on the signal of the light detector. When the diameter is set to be equal to or less than 0.5% of the length of the resin accommodation unit, it becomes possible to detect the volume change of the ion exchange resin by on/off of the light transmission, which can easily judge the life of the ion exchange resin.

Further, it may be configured such that the life detector includes a suppression solution measurement unit for measuring conductivity or pH of a solution flowing out of the ion exchange resin column to detect a life of the ion exchange resin based on a change in conductivity or pH measured by the suppression solution measurement unit. When the life of the ion exchange resin is ended, the conductivity and the pH of the solution flowing out of the ion exchange resin column changes. Therefore, the life of the ion exchange resin column can be easily detected by detecting the change in the conductivity or the pH.

Hereinafter, one example of a suppressor system and a method for determining a life of an ion exchange resin column will be described with reference to drawings. One example of an ion chromatograph and a suppressor system used therefor is shown in FIG. 1.

A sample injection portion 6, an analytical column 8, a suppressor 10, and a conductivity measuring unit 12 are provided from the upstream side on an analysis flow path 2 through which a solvent 5 is supplied by a liquid supply pump 4. The suppressor 10 and the conductivity measuring unit 12 are accommodated in the column oven 14 together with the analytical column 8 and maintained at a constant temperature.

The sample injected into the analysis flow path 2 by the sample injection portion 6 is separated into respective ions in the analytical column 8 and the eluent from the analytical column 8 is guided to the conductivity measuring unit 12 via the suppressor 10. After the conductivity is detected, the eluent is discharged as a waste liquid. The suppressor 10 is provided to remove unnecessary ions other than sample components in the eluent from the analytical column 8 to enable high sensitivity measurement. The suppressor 10 is a part of a suppressor system.

The suppressor 10 is provided with an eluent flow path 16 composed of a cylindrical ion exchange membrane 18 therein and a suppression solution flow path 20 is provided outside the eluent flow path 16. The eluent from the analytical column 8 flows through the eluent flow path 16 and the suppression solution flows through the suppression solution flow path 20 separated by the ion exchange membrane 18.

The suppression solution is a liquid for regenerating the ionic functional group of the ion exchange membrane 18, and an aqueous solution such as pure water or sulfuric acid is used. When the ion exchange membrane 18 is a cation exchange membrane, the ionic functional group is $H^+$, and when the ion exchange membrane 18 is an anion exchange membrane, the ionic functional group is $OH^-$.

Explaining that the ion chromatograph of this example is for an anion analysis, as the ion exchange membrane 18, a cation exchange membrane is used. In the suppressor 10, a cation, which is an unnecessary ion, is exchanged with a hydrogen ion and selectively removed by the ion exchange membrane 18 from the eluent flowing through the eluent flow path 16 by adsorption and dialysis by the ion exchange membrane 18. The hydrogen ion exchanged with the cation reacts with a hydroxide ion in the eluent and is converted into water, so the conductivity of the eluent decreases and the detection noise in the conductivity measuring unit 12 decreases. The cation adsorbed by and dialyzed to the ion exchange membrane 18 is exchanged with the hydrogen ion in the suppression solution flowing through the suppression solution flow path 20 and released into the suppression solution.

In cases where the ion chromatograph of this example is for a cation analysis, an anion exchange membrane is used as the ion exchange membrane 18. The anion, which is an unnecessary ion, is exchanged with a hydroxide ion and selectively removed by the ion exchange membrane 18 from the eluent flowing through the eluent flow path 16. The hydroxide ion exchanged with the anion reacts with the hydrogen ion in the eluent and is converted into water, so the conductivity of the eluent decreases and the detection noise in the conductivity measuring unit 12 decreases. Further, the anion adsorbed by and dialyzed to the ion exchange membrane 18 is exchanged with the hydroxide ion in the suppression solution flowing through the suppression solution flow path 20 and released into the suppression solution.

The suppressor system in this example is provided with a circulation flow path which exchanges the cation released in the suppression solution with a hydrogen ion or exchanges the anion with a hydroxide ion to regenerate a suppression solution and introduces it again into the suppression solution flow path 20.

Explaining the circulation flow path along the flow path of the suppression solution, the suppression solution flowing through the suppression solution flow path 20 flows out of the suppression solution outlet 36 and is temporarily stored in the suppression solution container 32 via the flow path 34. The suppression solution stored in the suppression solution container 32 is pumped up by the pump 30 and introduced to the ion exchange resin column 26 through the flow path 28. The ion exchange resin column 26 is arranged in the vertical direction, and the suppression solution introduced from its lower end is passed through the ion exchange resin sealed in the ion exchange resin column 26 from the lower end. Thereafter, the suppression solution passes through the flow path 24 connected to the upper end of the ion exchange resin column 26 and is again introduced to the suppression solution flow path 20 from the suppression solution inlet 22.

In cases where the ion chromatograph is for a cation analysis, the ion exchange resin filled in the ion exchange resin column 26 is a strong acidic ion exchange resin. In this case, in the ion exchange resin column 26, the cation in the suppression solution is exchanged with the hydrogen ion of the ion exchange resin.

In cases where the ion chromatograph is for an anion analysis, the ion exchange resin filled in the ion exchange resin column 26 is a weak alkaline ion exchange resin. In this case, in the ion exchange resin column 26, the anion in the suppression solution is exchanged with the hydroxide ion of the ion exchange resin.

As a life detector to detect the life of the ion exchange resin column 26, a light source 38 for irradiating light to the upper end portion 26a of the ion exchange resin column 26 in which the ion exchange resin is sealed and a light detector 40 provided at the opposite position across the ion exchange resin column 26 are provided.

Figure 2:
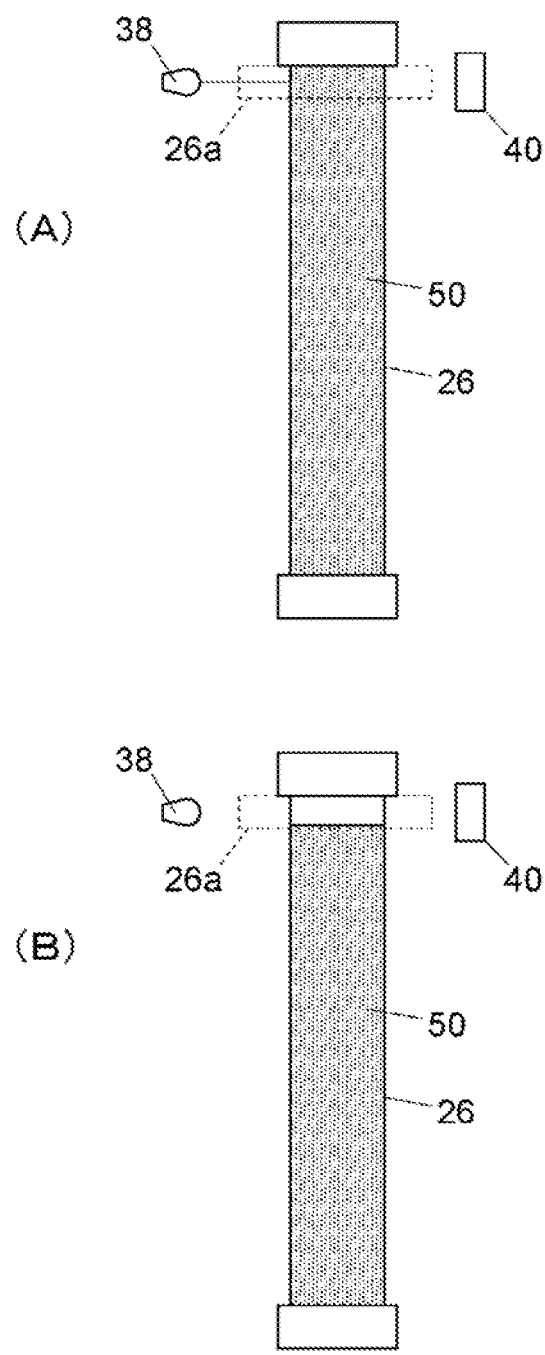
FIG. 2 is a view showing a state before and after an ion exchange resin in an ion exchange resin column of the embodiment reaches a breakthrough.

As shown in FIG. 2(A), in cases where the ion exchange resin 50 of the ion exchange resin column 26 is a strong acidic exchange resin, the ion exchange resin 50 is filled up to the upper end of the resin accommodation unit of the ion exchange resin column 26. The portion of the container of the ion exchange column 26 for accommodating the ion exchange resin 50 (hereinafter referred to as "resin accommodation unit") is cylindrical and its material is a transparent resin. The entire portion of the container may be transparent, but if at least the upper end portion 26a which can detect the volume change of the ion exchange resin 50 is transparent, the other part may not be transparent. As the material of the resin accommodation unit, for example, an ABS resin (copolymerized synthetic resin of acrylonitrile, butadiene, styrene) and a polycarbonate resin can be exemplified.

When the ion exchange resin 50 reaches the breakthrough point, the volume of the ion exchange resin 50 decreases by about 6% to 12% at the maximum, and as shown in FIG. 2(B), a gap is formed at the upper end portion 26a of the resin accommodation unit of the column 26. Therefore, it is possible to detect whether or not the ion exchange resin 50 has reached the breakthrough point by irradiating light having a diameter of about 1 mm (0.5% or less of the length of the resin accommodation unit) from the light source 38 toward a position lower by about 50% of the maximum amount of displacement of the upper end of the ion exchange resin, that is, a position lower by about 3% to 5% of the length of the resin accommodation unit, from the upper end portion 26a of the resin accommodation unit of the column 26 and judging whether or not the detection signal of the light detector 40 for detecting light passing through the column 26 has exceeded a predetermined threshold value.

Further, it is considered that the displacement amount of the upper end of the ion exchange resin increases as the inner diameter of the column 26 decreases. For this reason, the inner diameter of the upper end portion 26a of the resin accommodation unit of the column 26 may be made smaller than the inner diameter of the other portion thereof so that the breakthrough point can be detected with higher sensitivity.

When light is irradiated from the light source 38 to the upper end portion of the resin accommodation unit of the column 26, in cases where the ion exchange resin 50 is a cation exchange resin, although the ion exchange resin is still in a usable state, it will be determined that the life of the ion exchange resin is ended regardless of a slight decrease in volume. On the other hand, in cases where the ion exchange resin 50 is an anion exchange resin, since the life of the ion exchange resin 50 will not be detected until the volume of the resin is maximally increased, the analysis is performed with the column 26 in a state in which the anion adsorption ability is lowered. Therefore, it is preferable that the position where the light is irradiated from the light source 38 to the column 26 be a position of about 50% of the maximum amount of displacement of the upper end of the ion exchange resin 50.

As the light source 38, for example, a tungsten light source, a light emitting diode (LED), a laser, or the like may be used. Further, in order to convert the light from the light source 38 into a light flux with a small diameter, a condensing lens may be arranged between the light source 38 and the column 26.

Figure 3:
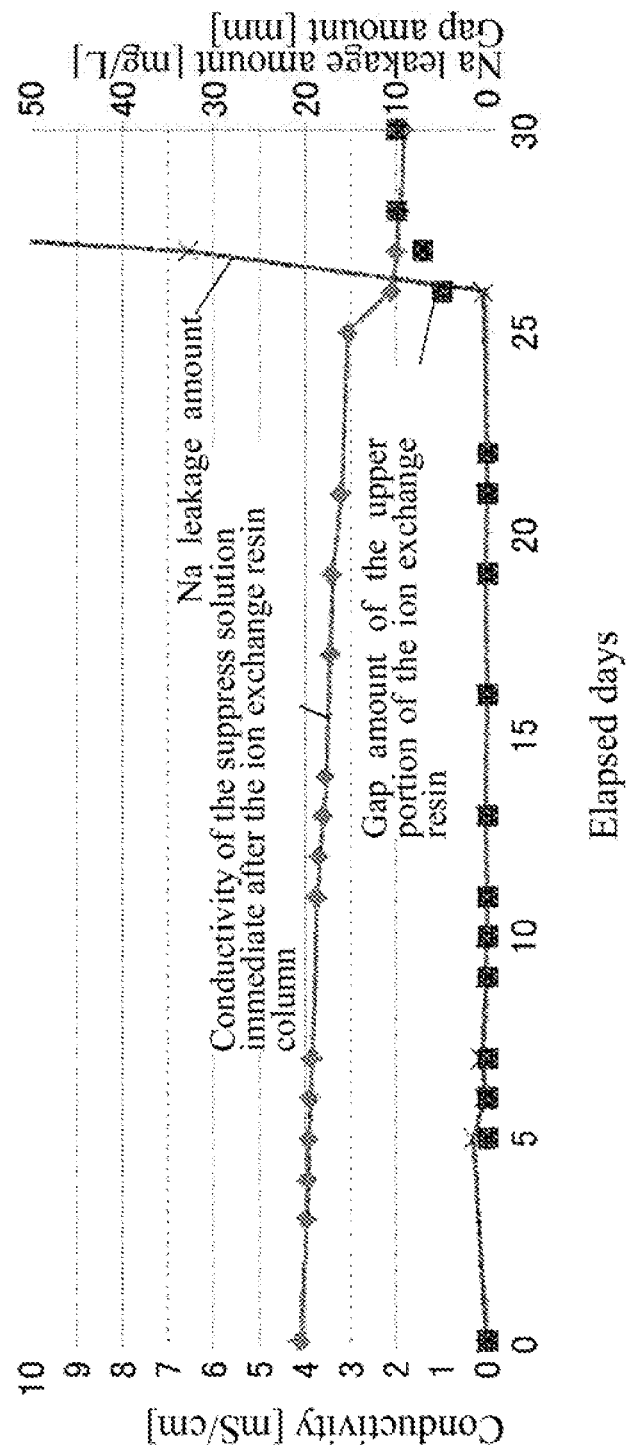
FIG. 3 shows survey data showing a relationship between the number of used days of the ion exchange resin column, the conductivity of the suppression solution (sulfuric acid) flowing out of the column, and the leakage amount of the cation (Na ion), and the amount of gap formed at the upper end portion of the column.

FIG. 3 shows survey data showing a relationship between the number of used days of the ion exchange resin column 26, the conductivity of the suppression solution (sulfuric acid) from the column 26, and the leakage amount of the cation (Na ion), and the gap amount formed at the upper end of the column 26. As shown in the data, it is understood that the Na ion amount in the suppression solution flowing out of the column 26 is increased sharply from the $26^{th}$ day to the $27^{th}$ day, and the ion exchange resin reached the breakthrough point at this timing. It is also understood that the gap at the upper end portion 26a of the column 26 is kept at approximately 0 mm until the ion exchange resin reaches the breakthrough point, and the gap of about 5 to 10 mm is generated at the timing when the breakthrough point is reached. Therefore, there is a correlation between the gap at the upper end portion 26a of the column 26 and the life of the ion exchange resin 50, and therefore optical detection of the gap at the upper end portion 26a of the column 26 enables detection of the life of the exchange resin 50 when the gap amount reaches a certain amount.

The above data are for the case in which the ion exchange resin 50 is strong acidic ion exchange resin. However, in the case of a weak alkaline ion exchange resin, on the contrary, a phenomenon occurs in which although a certain amount of gap is existed at the upper end of the column 26 until the ion exchange resin 50 reaches the breakthrough point, when the ion exchange resin 50 reaches the breakthrough point, the volume is increased and the gap becomes narrow. Therefore, in this case, it is possible to detect the life of the ion exchange resin 50 when the detection signal of the light detector 40 becomes equal to or lower than a preset threshold value.

Returning to FIG. 1 and continuing the explanation, the control unit 42 for controlling the entire ion chromatograph is equipped with a life detector 44 for detecting the life of the ion exchange resin in the ion exchange resin column 26 based on a detection signal from the light detector 40. The control unit 42 is a general-purpose personal computer or a dedicated computer. The life detector 44 is a function attained by a computer constituting the control unit 42 executing a predetermined program. When the life detector 44 detects the end of life of the ion exchange resin, it is preferable that a message showing the end of life be displayed on the display unit 46 composed of, e.g., a liquid crystal display. Further, when the life detector 44 detects the end of life of the ion exchange resin, it may be configured such that the operation of the liquid supply pump 4 be stopped and the analysis be interrupted.

Figure 4:
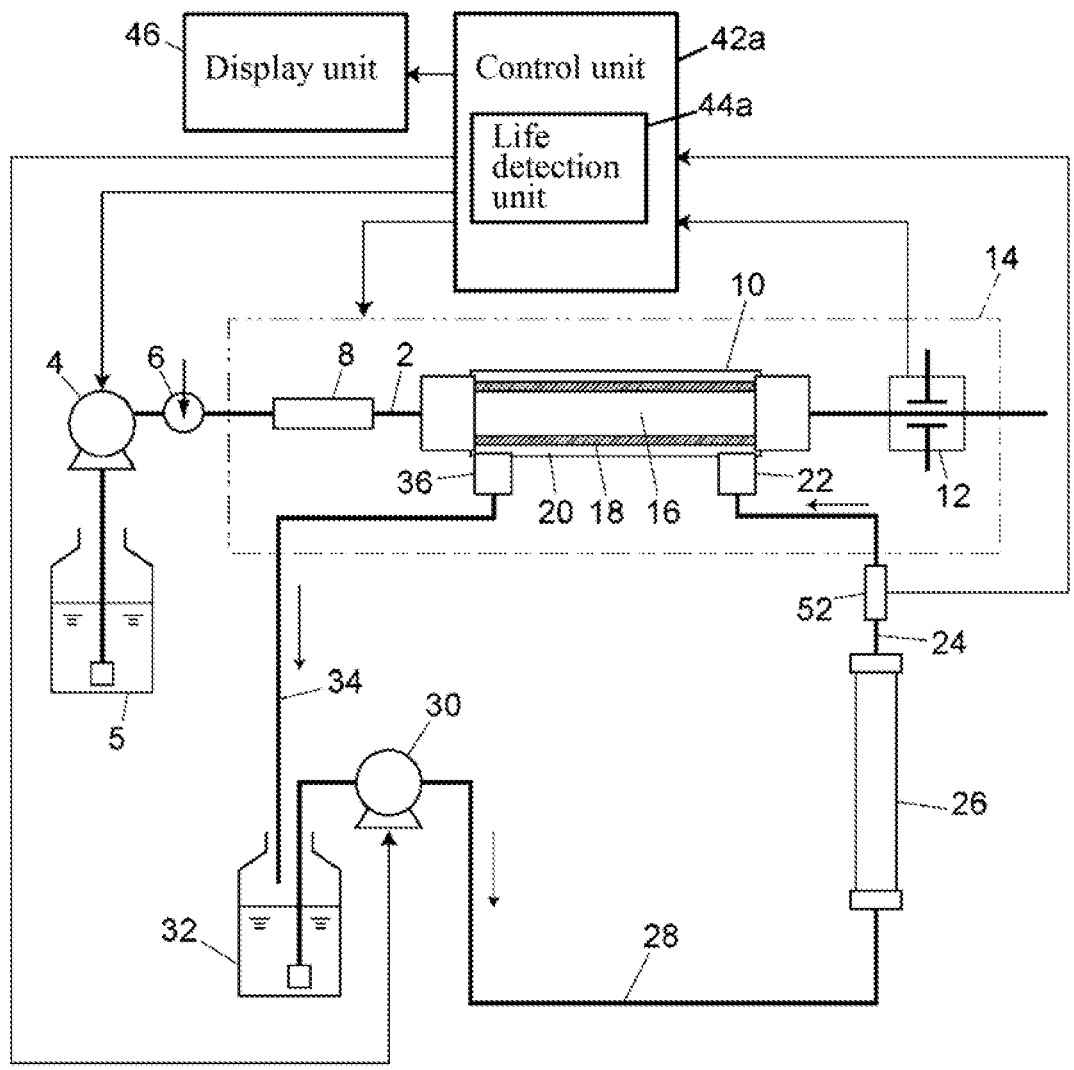
FIG. 4 is a schematic configuration diagram showing another example of the suppressor system.

Further, as shown in FIG. 3, when the ion exchange resin in the ion exchange resin column 26 reaches the breakthrough point, the conductivity of the suppression solution passed through the column 26 changes. Therefore, it may be configured such that, as shown in FIG. 4, a conductivity measuring unit 52 is provided immediately after the column 26, and the life detector 44a of the control unit 42a detects the end of life of the ion exchange resin when the change of the signal from the conductivity measuring unit 52 exceeds a preset threshold.

Further, since the conductivity change is caused by the leaked ions from the column 26, the pH of the suppression solution flowing out of the column 26 also changes. Therefore, it may be configured such that the conductivity measuring unit 52 is replaced with a pH measuring unit so that the life of the ion exchange resin is detected when the change amount of the pH of the suppression solution exceeds a preset threshold value.

DESCRIPTION OF REFERENCE SYMBOLS

2: analysis flow path
4, 30 liquid supply pump
5: solvent
6: sample injection portion
8: analytical column
10: suppressor
12: conductivity measuring unit
14: column oven
16: eluent flow path
18: ion exchange membrane
20: suppression solution flow path
22: suppression solution inlet
24, 28, 34: flow path
26: ion exchange resin column
32: suppression solution container
36: suppression solution outlet
38: light source
40: light detector
42, 42a: control unit
44, 44a: life detector
46: display unit
50: ion exchange resin

The invention claimed is:

1. A suppressor system comprising:
a suppressor having an eluent flow path through which an eluent flows and a suppression solution flow path through which a suppression solution flows, the eluent flow path and the suppression solution flow path being provided so as to be separated by an ion exchange membrane;
a circulation flow path that connects an inlet and an outlet of the suppression solution flow path of the suppressor to circulate the suppression solution;
an ion exchange resin column provided on the circulation flow path and including a resin accommodation unit through which the suppression solution flowing out of the suppressor flows and an ion exchange resin, which is acidic or alkaline, accommodated in the resin accommodation unit; and
a life detector configured to determine a life of the ion exchange resin in the ion exchange resin column,
wherein the ion exchange resin column has a longitudinal direction,
wherein the life detector includes:
a light source for irradiating light from a direction across the longitudinal direction of the ion exchange resin column toward the ion exchange resin, and
a light detector for detecting light from the light source transmitted through the ion exchange resin column, and
wherein the life detector is configured to determine the life of the ion exchange resin in the ion exchange resin column by detecting:
that an output signal of the light detector exceeds a predetermined threshold due to a decrease in a volume of the ion exchange resin in the longitudinal direction, or
that the output signal of the light detector is below the predetermined threshold due to an increase in a volume of the ion exchange resin in the longitudinal direction.

2. The suppressor system as recited in claim 1, wherein:
a light transmitting portion that changes in optical transparency according to a volume change of the ion exchange resin in the resin accommodation unit is provided at an upper end portion of the resin accommodation unit of the ion exchange resin column, and
the light source is arranged so as to irradiate light toward the light transmitting portion of the ion exchange resin column.

3. The suppressor system as recited in claim 2, wherein:
the ion exchange resin is a weak alkaline anion exchange resin which increases in volume due to adsorption of an anion, and
the life detector determines the life of the ion exchange resin based on whether the output signal of the light detector exceeds the predetermined threshold.

4. The suppressor system as recited in claim 2, wherein the light source is arranged so as to irradiate the light in a horizontal direction to a position lower from an upper end portion of the resin accommodation unit by about 50% of a maximum amount of displacement of an upper end portion of the ion exchange resin.

5. The suppressor system as recited in claim 2, wherein a diameter of a light flux of the light irradiated from the light source to the resin accommodation unit is 0.5% or less of a length of the resin accommodation unit.

6. The suppressor system as recited in claim 1, wherein:
the ion exchange resin is a strong acidic cation exchange resin which decreases in volume due to adsorption of a cation, and
the life detector determines the life of the ion exchange resin based on whether the output signal of the light detector is below the predetermined threshold.

7. The suppressor system as recited in claim 1, wherein the life detector includes a suppression solution measurement unit for measuring conductivity or pH of a liquid flowing out of the ion exchange resin column and is configured to determine the life of the ion exchange resin based on a change in conductivity or pH measured by the suppression solution measurement unit.

8. A method for determining a breakthrough point of an ion exchange resin in an ion exchange resin column, comprising:
irradiating light from a direction across a longitudinal direction of the ion exchange resin column, which includes a resin accommodation unit in which the ion exchange resin is accommodated, toward the ion exchange resin;
detecting the irradiated light transmitted through the ion exchange resin column by a light detector;
detecting a volume change of the ion exchange resin in the resin accommodation unit, which occurs when the ion exchange resin reaches the breakthrough point by detecting that an output signal of the light detector exceeds a predetermined threshold or by detecting that the output signal of the light detector is below a predetermined threshold; and
determining the breakthrough point of the ion exchange resin by detecting the volume change of the ion exchange resin.

* * * * *